(12) United States Patent
Elving

(10) Patent No.: US 6,311,927 B1
(45) Date of Patent: Nov. 6, 2001

(54) EMERGENCY LANDING GEAR EXTENSION SYSTEM USING PYROTECHNIC OPERATED HIGH PRESSURE BOTTLE

(75) Inventor: Carl Theodore Elving, South Windsor, CT (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/613,740

(22) Filed: Jul. 11, 2000

(51) Int. Cl.$^7$ .................................................. B64C 25/22
(52) U.S. Cl. ................................ 244/100 R; 244/104 FP
(58) Field of Search ........................... 244/102 R, 100 R, 244/104 FP, 129.5, 107, 129.4, 137.4

(56) References Cited

U.S. PATENT DOCUMENTS

| | | | |
|---|---|---|---|
| 2,659,555 | * | 11/1953 | Schlender . |
| 2,758,807 | * | 8/1956 | Ryan . |
| 3,284,031 | * | 11/1966 | Albright . |
| 4,052,024 | * | 10/1977 | Smith . |
| 4,233,652 | * | 11/1980 | Oswald . |
| 5,058,827 | * | 10/1991 | Dansereau et al. . |
| 5,184,465 | * | 2/1993 | Howard et al. . |
| 5,460,340 | * | 10/1995 | White . |
| 5,907,118 | * | 5/1999 | Jakubowski et al. . |
| 5,944,285 | * | 8/1999 | Royer et al. . |

* cited by examiner

Primary Examiner—Charles T. Jordan
Assistant Examiner—Tien Dinh
(74) Attorney, Agent, or Firm—Robert A. Schruhl

(57) ABSTRACT

A landing gear actuation system for deploying aircraft landing gear and associated doors includes a pressurized gas source, a first hydraulic circuit for actuating landing gear doors, a second hydraulic circuit for actuating landing gear, and valving for regulating flow of gas sequentially from the source to the first hydraulic circuit, and from the first hydraulic circuit to the second hydraulic circuit. The pressurized gas source includes a container, a gas in the container at a pressure of approximately 6500 psi, and a pyrotechnically actuated device for opening the container. Preferably, the gas comprises helium, nitrogen or a combination thereof. The pyrotechnically actuated device comprises a burst disk cutter valve, and the pressurized gas source further comprises a pressure regulator for reducing the pressure of gas flowing from the container to a safer level of pressure of approximately 2000–3000 psi.

5 Claims, 1 Drawing Sheet

EMERGENCY LANDING GEAR EXTENSION SYSTEM USING PYROTECHNIC OPERATED HIGH PRESSURE BOTTLE

BACKGROUND OF THE INVENTION

1. Field of the Invention

The present invention relates to landing gear arrangements, and more particularly to a landing gear extension system that includes landing gear and doors covering the landing gear, and which uses a pyrotechnically initiated high pressure bottle to activate the extension system.

2. Description of the Related Art

Landing gear extension systems are well known in the art, as are pneumatic operating systems.

U.S. Pat. No. 2,758,807 to Ryan discloses an apparatus for effecting retraction of landing gear on an aircraft in which the apparatus uses an explosive cartridge to initiate operation of the apparatus. The system does not employ pressurized gas contained in a bottle.

U.S. Pat. No. 4,052,024 to Smith discloses a pneumatic gear motor for use with aerospace vehicle control fins is controlled by a servo valve which is fed by pressurized gas from a reservoir. An inert gas in the reservoir is heated to further increase the pressure in the reservoir by an explosive charge housed adjacent the reservoir. The heated inert gas is then released to a pressure control valve before being passed to the gear motor.

U.S. Pat. No. 5,184,465 to Howard et al. teaches a hydraulically driven actuator for raising and lowering aircraft landing gear. The patent fails to disclose sequential operation of the landing gear and its housing doors.

Other control systems for high performance air vehicles include those disclosed in U.S. Pat. No. 4,754,940 to Deter, U.S. Pat. No. 5,460,340 to White, and U.S. Pat. No. 4,793,137 to Musk.

While many of these previously proposed systems use pressurized gas from a reservoir and are useful for operation of aircraft landing gear, control fins and flaps, none disclose the use of pressurized gas to sequentially actuate the landing gear doors and then the landing gear itself. Further, the prior art devices include gas cannisters that are of significant size to achieve the desired action, and therefore require frequent replenishment to maintain the requisite pressure. Such service procedures are excessively labor-and cost-intensive.

Against this background of known technology, the applicant has developed a novel system for deploying aircraft landing gear and doors in the event of hydraulic or other failure. The system uses a high pressure gas bottle charged to very high pressure, on the order of 6500 psi or higher, which can be opened by a pyrotechnically fired disk cutter to allow the gas in the bottle to flow out. The gas is then regulated to safer pressures and passed to valving which sequentially controls hydraulically operated landing gear and associated housing doors.

OBJECTS AND SUMMARY OF THE INVENTION

It is therefore an object of the present invention to provide a novel hydraulic system for deploying aircraft landing gear and associated housing doors, while overcoming many of the disadvantages and drawbacks of similar fuel tanks known in the art.

Another object of the present invention is to provide a pressurized gas system including novel discharge valving apparatus for initiating deployment of aircraft landing gear.

Still another object of the invention is to provide a landing gear system which uses gas pressurized to 6500 psi, and which employs a pyrotechnically initiated valve for releasing the pressurized gas to drive valving for sequentially operating the landing gear and housing doors.

These and other objects, advantages and features of the invention will become more apparent, as will equivalent structures which are intended to be covered herein, with the teaching of the principles of the invention in connection with the disclosure of the preferred embodiments thereof in the specification, claims and drawings in which:

DETAILED DESCRIPTION OF THE INVENTION

Figure 1:
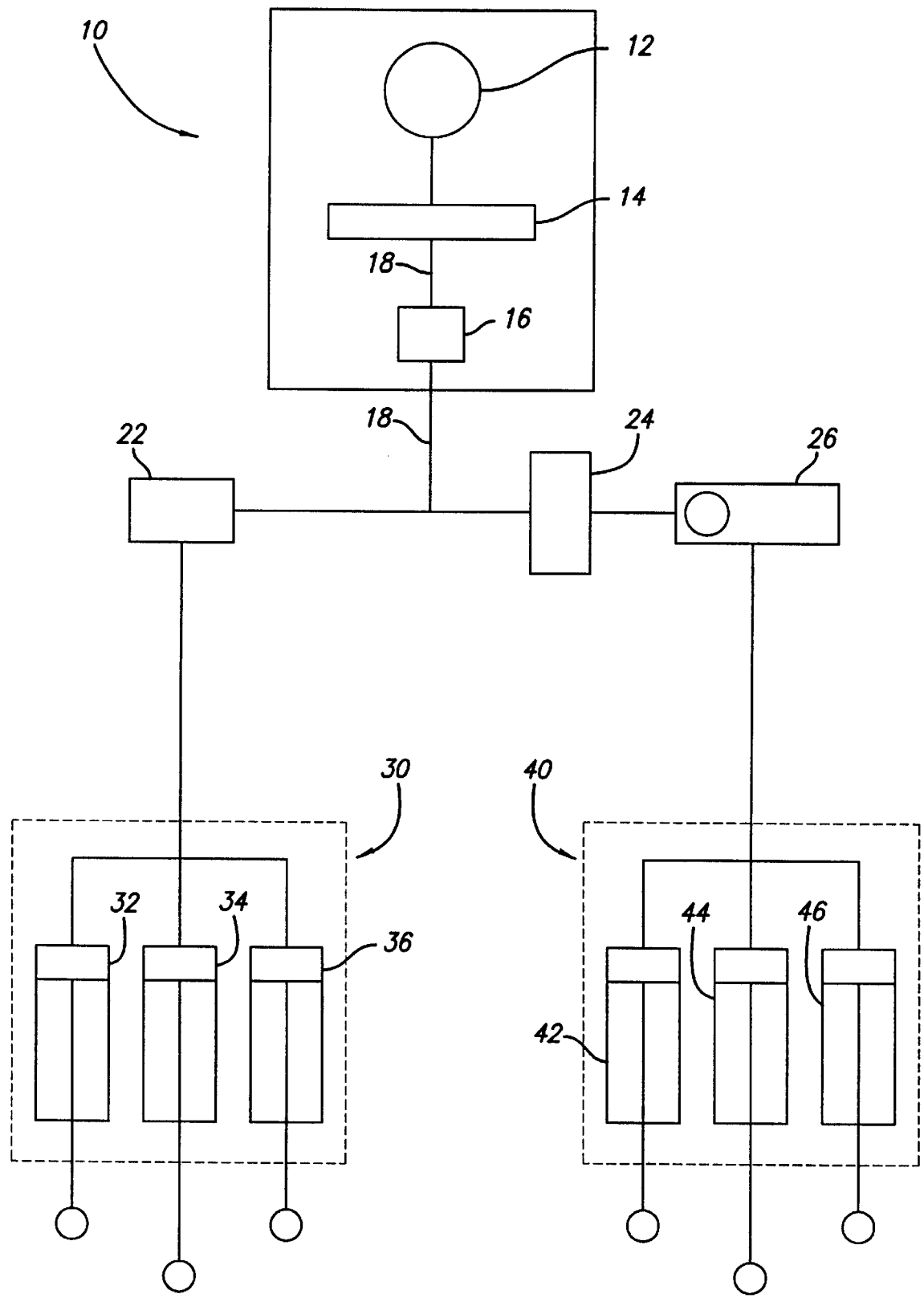
FIG. 1, the sole drawing FIGURE, depicts the hydraulic circuit of the present invention.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a novel highly pressurized hydraulic system for deploying landing gear and other hydraulically actuated components on an aircraft, such as the doors covering the landing gear bays.

Referring now to the drawing, it can be seen that the present invention comprises a collection of components arranged in the manner shown in FIG. 1. A gas reservoir assembly 10 includes a gas containing bottle 12, a pyrotechnic disk cutter valve 14, and a pressure regulator 16 connected by tubing 18. The gas bottle 12 is sealed and leak-free, and contains a gas that is charged to a pressure of at least 6500 psi. Preferably, the gas is helium or nitrogen, or a combination thereof. Opening the gas bottle 12 to allow the gas inside to escape is accomplished by use of a disk cutter in the valve 14. The burst disk cutter is an integral part of the gas reservoir system and is pyrotechnically actuated by a 5 ampere electrical signal from an external source (not shown). Actuation of the valve 14 enables cutting of a burst disk (not shown) on the gas bottle.

After the burst disk cutter valve 14 is activated, the high pressure gas is regulated to a safe operating pressure of from about 2000 psi to 3000 psi through the pressure regulator 16 which is also an integral part of the gas bottle assembly 10.

The released gas at a pressure of 2000–3000 psi then travels through the aircraft tubing 18 to a shuttle valve 22 where it isolates the normal landing gear door opening circuit 30 and travels to the door actuators 32, 34, 36. The actuators extend as a result of the pressurized gas acting on the pistons of the actuators, and the landing gear doors open.

After a delay (preferably, approximately 10 seconds) to allow the landing gear doors to open, the emergency gear extend valve 24 opens and the 2000–3000 psi pressure regulated gas travels through the emergency gear extend valve to a second shuttle valve 26 where it isolates the normal landing gear circuit 40. The pressurized gas then travels to the landing gear retract/extend actuators 42, 44, 46. The actuators 42, 44, 46 extend due to the pressurized gas acting on the pistons of the actuators, and the landing gear extends. Pressure continues to be applied to the landing gear actuators until after the aircraft has been shut down and the pressure is then manually bled off. Thereafter, the gas bottle is replaced with a new, charged, bottle.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. A landing gear actuation system on an aircraft, comprising:
   a pressurized gas source,
   a first hydraulic circuit for actuating landing gear doors,
   a second hydraulic circuit distinct form said first hydraulic circuit for actuating landing gear, and
   valving means for sequentially controlling said first and second hydraulic circuits, said valving means includes means for controlling the flow of pressurized gas from said source to said first hydraulic circuit, and then from said first hydraulic circuit to said second hydraulic circuit.

2. The landing gear actuation system of claim 1, wherein said pressurized gas source comprises a container, a gas in said container at a pressure of approximately 6500 psi, and pyrotechnically actuated means for opening said container.

3. The landing gear actuation system of claim 1 wherein said gas comprises helium, nitrogen or a combination thereof.

4. The landing gear actuation system of claim 2, wherein said pyrotechnically actuated means comprises a burst disk cutter valve, and said pressurized gas source further comprises a pressure regulator for reducing the pressure of gas flowing from said container to approximately 2000–3000 psi.

5. The landing gear actuation system of claim 1, wherein said valving means further comprises timing means for regulating the flow of gas between said first hydraulic circuit and said second hydraulic circuit.

* * * * *